United States Patent
Karau

(10) Patent No.: US 10,653,272 B2
(45) Date of Patent: May 19, 2020

(54) BARBECUE OVEN AND METHOD OF OPERATION

(71) Applicant: William H. Karau, Southlake, TX (US)

(72) Inventor: William H. Karau, Southlake, TX (US)

(73) Assignee: KBQ TECHNOLOGIES, LLC, Southlake, TX (US)

( * ) Notice: Subject to any disclaimer, the term of this patent is extended or adjusted under 35 U.S.C. 154(b) by 439 days.

(21) Appl. No.: 15/363,834

(22) Filed: Nov. 29, 2016

(65) Prior Publication Data

US 2017/0071404 A1    Mar. 16, 2017

Related U.S. Application Data

(63) Continuation of application No. 13/826,559, filed on Mar. 14, 2013, now Pat. No. 9,526,376.

(51) Int. Cl.
*A47J 37/07* (2006.01)

(52) U.S. Cl.
CPC ....... *A47J 37/0754* (2013.01); *A47J 37/0768* (2013.01); *A47J 37/0786* (2013.01)

(58) Field of Classification Search
CPC ................... A47J 37/0754; A47J 37/0768
USPC ......... 99/482, 481, 339, 340, 480, 476, 357, 99/474, 331; 126/17, 79, 25 R, 21 A
See application file for complete search history.

(56) References Cited

U.S. PATENT DOCUMENTS

| | | | |
|---|---|---|---|
| 266,425 A | 10/1882 | Broomell | |
| 317,431 A | 5/1885 | Allen | |
| 503,872 A | 8/1893 | Petersen | |
| 580,753 A | 4/1897 | Barnard | |
| 652,531 A | 6/1900 | Carlson | |
| 739,214 A | 9/1903 | Phillips | |
| 754,557 A | 3/1904 | Greene | |
| 777,467 A | 12/1904 | Yuncker | |
| 821,487 A | 5/1906 | Hammack | |
| 834,229 A | 10/1906 | Blanchard | |
| 848,018 A | 3/1907 | Engelhard | |
| 904,382 A | 11/1908 | Van Patten | |
| 926,531 A | 6/1909 | Williams | |
| 928,695 A | 7/1909 | Pinegar | |
| 934,512 A | 9/1909 | Esposito | |
| 1,072,231 A | 9/1913 | Howell | |

(Continued)

FOREIGN PATENT DOCUMENTS

| CN | 202983719 | 6/2013 |
|---|---|---|
| EP | 0373496 | 6/1990 |
| KR | 20130005637 | 1/2013 |

OTHER PUBLICATIONS

International Search Report and Written Opinion for International Application No. PCT/US2017/038189 by Russia Search Authority, dated Nov. 9, 2017, 7 pages.

(Continued)

*Primary Examiner* — Phuong T Nguyen
(74) *Attorney, Agent, or Firm* — Jackson Walker LLP; Christopher J. Rourk

(57) ABSTRACT

A barbecue oven that enables operator control of the combustion process through selective control of gas flow through and/or around a hot, oxygenated bed of coals and further enables automatic control of oven temperature through thermostatic regulation of forced draft.

20 Claims, 7 Drawing Sheets

(56) References Cited

U.S. PATENT DOCUMENTS

| | | |
|---|---|---|
| 1,150,172 A | 8/1915 | Chadwick |
| 1,189,818 A | 7/1916 | Holloway |
| 1,302,682 A | 5/1919 | Legg |
| 1,486,875 A | 3/1924 | Freeman |
| 1,492,892 A | 5/1924 | Muse |
| 1,534,867 A | 4/1925 | Peschke et al. |
| 1,595,846 A | 8/1926 | Wood |
| 1,751,219 A | 10/1928 | Seamon |
| 1,779,453 A | 10/1930 | Taylor |
| 1,952,968 A | 3/1934 | Brand |
| 1,964,372 A | 6/1934 | Tygart |
| 2,074,945 A | 3/1937 | Skvor |
| 2,096,373 A | 10/1937 | Doherty |
| 2,143,999 A | 1/1939 | Rosson |
| 2,168,388 A | 8/1939 | Bemis |
| 2,262,910 A | 11/1941 | Aller |
| 2,314,627 A | 3/1943 | Millikan et al. |
| 2,335,217 A | 11/1943 | Tate |
| 2,352,590 A | 6/1944 | Trinkle |
| 2,444,985 A | 7/1948 | Fulton |
| 2,505,973 A | 5/1950 | Julian |
| 2,558,569 A | 6/1951 | Koch |
| 2,567,549 A | 9/1951 | Christensen |
| 2,568,022 A | 9/1951 | Parker |
| 2,600,760 A | 6/1952 | Guffey |
| 2,604,033 A | 7/1952 | Chadwick et al. |
| 2,625,095 A | 1/1953 | Julian |
| 2,626,559 A | 1/1953 | Rau |
| 2,640,414 A | 6/1953 | Jensen |
| 2,715,870 A | 8/1955 | Rutkowski |
| 2,734,499 A | 2/1956 | Lombardi |
| 2,746,377 A | 5/1956 | Parks |
| 2,760,428 A | 8/1956 | Boyajian |
| 2,789,877 A | 4/1957 | Pfundt |
| 2,790,380 A | 4/1957 | Shryack |
| 2,811,099 A | 10/1957 | McGoldrick |
| 2,833,201 A | 5/1958 | Simank |
| 2,842,043 A | 7/1958 | Reuland |
| 2,846,937 A | 8/1958 | Jones |
| 2,851,941 A | 9/1958 | Cogar |
| 2,867,165 A | 1/1959 | Money |
| 2,885,950 A | 5/1959 | Stoll et al. |
| 2,894,448 A | 7/1959 | Henderson et al. |
| 2,920,177 A | 1/1960 | Brane |
| 2,930,310 A | 3/1960 | Poppenburg |
| 2,985,097 A | 5/1961 | Nevin et al. |
| 3,041,959 A | 7/1962 | Oyler |
| 3,049,071 A | 8/1962 | Diack |
| 3,087,414 A | 4/1963 | Gannon |
| 3,098,428 A | 7/1963 | Maxwell |
| 3,154,005 A | 10/1964 | Roecks et al. |
| 3,190,281 A | 6/1965 | Northwood |
| 3,199,436 A | 8/1965 | Rasmussen et al. |
| 3,217,634 A | 11/1965 | Fox |
| 3,220,336 A | 11/1965 | Hoover |
| 3,223,022 A | 12/1965 | Powell |
| 3,247,827 A | 4/1966 | Cremer |
| 3,266,409 A | 8/1966 | Oyler |
| 3,279,452 A | 10/1966 | Hottenroth et al. |
| 3,316,831 A | 5/1967 | Koland et al. |
| 3,324,788 A | 6/1967 | La France |
| 3,340,794 A | 9/1967 | Giuliano |
| 3,361,055 A | 1/1968 | Hondroulis |
| 3,364,912 A | 1/1968 | Dills et al. |
| 3,379,190 A | 4/1968 | Leach |
| 3,380,444 A | 4/1968 | Stalker |
| 3,397,632 A | 8/1968 | Moler |
| 3,435,754 A | 4/1969 | Lohr et al. |
| 3,438,364 A | 4/1969 | Galloway, Jr. |
| 3,455,233 A | 7/1969 | Cable |
| 3,474,725 A | 10/1969 | McClaren |
| 3,477,360 A | 11/1969 | Raney |
| 3,491,678 A | 1/1970 | Oyler |
| 3,513,823 A | 5/1970 | Fessmann |
| 3,517,602 A | 6/1970 | Horton |
| 3,524,403 A | 8/1970 | Treloar et al. |
| 3,543,672 A | 12/1970 | Payonk |
| 3,552,299 A | 1/1971 | Patoka |
| 3,561,348 A | 2/1971 | Weir, Sr. |
| 3,568,590 A | 3/1971 | Grice |
| 3,583,307 A | 6/1971 | Lee, Sr. |
| 3,589,269 A | 6/1971 | Weir, Sr. |
| 3,601,280 A | 8/1971 | Mills |
| 3,611,911 A | 10/1971 | Martin |
| 3,612,032 A | 10/1971 | Kweller et al. |
| 3,623,423 A | 11/1971 | Berger |
| 3,644,124 A | 2/1972 | Bedsole |
| 3,658,047 A | 4/1972 | Happel |
| 3,665,840 A | 5/1972 | Horany |
| 3,683,791 A | 8/1972 | Rast, Jr. |
| 3,696,803 A | 10/1972 | Holloway, Jr. |
| 3,699,876 A | 10/1972 | Ellis |
| 3,721,177 A | 3/1973 | Booker |
| 3,742,838 A | 7/1973 | Luschen et al. |
| 3,747,513 A | 7/1973 | Seelbach |
| 3,756,140 A | 9/1973 | Kolivas |
| 3,757,675 A | 9/1973 | Wilbricht |
| 3,789,824 A | 2/1974 | Mason |
| 3,792,654 A | 2/1974 | Turner |
| 3,809,056 A | 5/1974 | Snelling |
| 3,832,989 A | 9/1974 | Belford |
| 3,841,211 A | 10/1974 | Ellis |
| 3,882,767 A | 5/1975 | Oyler et al. |
| 3,903,788 A | 9/1975 | Freeland et al. |
| 3,913,557 A | 10/1975 | Ewanika et al. |
| 3,933,144 A | 1/1976 | Bandy |
| 3,937,138 A | 2/1976 | Tidwell |
| 3,938,494 A | 2/1976 | Clark |
| 3,951,052 A | 4/1976 | Ringo |
| 3,961,571 A | 6/1976 | Decuir |
| 3,967,547 A | 7/1976 | Sykes et al. |
| 3,971,308 A | 7/1976 | Parker |
| 3,982,476 A | 9/1976 | McLane |
| 3,982,522 A | 9/1976 | Hottenroth et al. |
| 3,991,666 A | 11/1976 | Tidwell et al. |
| 3,991,737 A | 11/1976 | Del Fabbro |
| 4,043,312 A | 8/1977 | Kern |
| 4,072,092 A | 2/1978 | Kohli et al. |
| 4,076,008 A | 2/1978 | Deaton |
| 4,089,258 A | 5/1978 | Berger |
| 4,094,295 A | 6/1978 | Boswell et al. |
| 4,094,296 A | 6/1978 | Beagley |
| 4,130,052 A | 12/1978 | Jacobson |
| 4,162,650 A | 7/1979 | Davis et al. |
| 4,165,683 A | 8/1979 | Van Gilst |
| 4,167,398 A | 9/1979 | Hughes et al. |
| 4,170,173 A | 10/1979 | Bradford |
| 4,184,420 A | 1/1980 | Podaras et al. |
| 4,190,677 A | 2/1980 | Robins |
| 4,232,597 A | 11/1980 | Perrine et al. |
| 4,300,523 A | 11/1981 | Robertson et al. |
| 4,307,659 A | 12/1981 | Martin et al. |
| 4,309,938 A | 1/1982 | Harmon |
| 4,334,462 A | 6/1982 | Hefling |
| 4,348,948 A | 9/1982 | Allison |
| 4,355,570 A | 10/1982 | Martin et al. |
| 4,362,093 A | 12/1982 | Griscom |
| 4,374,489 A | 2/1983 | Robbins |
| 4,383,518 A | 5/1983 | Beausoleil |
| 4,392,419 A | 7/1983 | Bonny |
| 4,401,018 A | 8/1983 | Berry |
| 4,418,615 A | 12/1983 | Higgins |
| 4,434,781 A | 3/1984 | Koziol |
| 4,442,762 A | 4/1984 | Beller |
| 4,467,709 A | 8/1984 | Anstedt |
| 4,471,748 A | 9/1984 | Venable |
| 4,474,107 A | 10/1984 | Cothran |
| 4,495,860 A | 1/1985 | Hitch et al. |
| 4,510,854 A | 4/1985 | Robertson |
| 4,512,249 A | 4/1985 | Mentzel |
| 4,554,864 A | 11/1985 | Smith et al. |
| 4,572,062 A | 2/1986 | Widdowson |
| 4,574,689 A | 3/1986 | Robertson |
| 4,643,162 A | 2/1987 | Collins |

(56) References Cited

U.S. PATENT DOCUMENTS

| | | | |
|---|---|---|---|
| 4,664,026 A | 5/1987 | Milloy | |
| 4,669,447 A | 6/1987 | Kelly | |
| 4,690,125 A | 9/1987 | Beller | |
| 4,697,506 A | 10/1987 | Ducate, Jr. | |
| 4,700,618 A * | 10/1987 | Cox, Jr. | A21B 1/28 |
| | | | 126/25 R |
| 4,702,224 A | 10/1987 | Griffith | |
| 4,721,037 A | 1/1988 | Blosnich | |
| 4,750,469 A | 6/1988 | Biggs | |
| 4,757,756 A | 7/1988 | Van Marr | |
| 4,762,059 A | 8/1988 | McLane, Sr. | |
| 4,770,157 A | 9/1988 | Shepherd et al. | |
| 4,773,319 A | 9/1988 | Holland | |
| 4,779,525 A | 10/1988 | Gaines | |
| 4,787,914 A | 11/1988 | Crace | |
| 4,810,510 A | 3/1989 | Lever et al. | |
| 4,823,684 A | 4/1989 | Traeger et al. | |
| 4,825,845 A | 5/1989 | Olivotti | |
| 4,857,074 A | 8/1989 | Crace | |
| 4,867,050 A | 9/1989 | Patenaude et al. | |
| 4,878,477 A | 11/1989 | McLane | |
| 4,882,985 A | 11/1989 | Beller | |
| 4,895,130 A | 1/1990 | Staschke | |
| 4,896,472 A | 1/1990 | Hunt | |
| 4,899,721 A | 2/1990 | Tsay | |
| 4,909,137 A | 3/1990 | Brugnoli | |
| 4,909,235 A | 3/1990 | Boetcker | |
| 4,909,970 A | 3/1990 | Pardo | |
| 4,934,260 A | 6/1990 | Blevins | |
| 4,934,272 A | 6/1990 | Sternin et al. | |
| 4,957,039 A | 9/1990 | Reyes | |
| 4,962,696 A | 10/1990 | Gillis | |
| 4,962,697 A | 10/1990 | Farrar | |
| 4,979,436 A | 12/1990 | McGowan | |
| 5,009,151 A | 4/1991 | Hungerford | |
| 5,031,602 A | 7/1991 | Vick | |
| 5,070,776 A | 12/1991 | Schlosser et al. | |
| 5,096,727 A | 3/1992 | Crace | |
| 5,097,817 A | 3/1992 | Dodgen | |
| 5,108,282 A | 4/1992 | Pardo | |
| 5,121,676 A | 6/1992 | Jurgens | |
| 5,129,385 A | 7/1992 | Dodgen | |
| 5,144,939 A | 9/1992 | Christopherson | |
| 5,156,140 A | 10/1992 | Zisman | |
| 5,158,066 A | 10/1992 | Dodgen | |
| 5,163,359 A | 11/1992 | McLane, Sr. | |
| 5,167,183 A | 12/1992 | Schlosser et al. | |
| 5,176,067 A | 1/1993 | Higgins | |
| 5,176,124 A | 1/1993 | Wrasse | |
| 5,191,831 A | 3/1993 | Walden | |
| 5,193,445 A | 3/1993 | Ferguson | |
| 5,195,423 A | 3/1993 | Beller | |
| 5,197,379 A | 3/1993 | Leonard, Jr. | |
| 5,222,475 A | 6/1993 | Greener | |
| 5,242,703 A | 9/1993 | Stewart | |
| 5,251,607 A | 10/1993 | Traeger et al. | |
| 5,279,214 A | 1/1994 | Lamendola | |
| 5,284,671 A | 2/1994 | Stewart | |
| 5,301,606 A | 4/1994 | Ferguson | |
| 5,313,877 A | 5/1994 | Holland | |
| 5,325,841 A | 7/1994 | Hooper, Sr. | |
| 5,359,923 A | 11/1994 | Boswell | |
| 5,359,988 A | 11/1994 | Hait | |
| 5,363,752 A | 11/1994 | Weil | |
| 5,373,778 A | 12/1994 | Moreth | |
| 5,404,801 A | 4/1995 | Holland | |
| 5,427,805 A | 6/1995 | Crace | |
| 5,431,093 A | 7/1995 | Dodgen | |
| 5,437,222 A | 8/1995 | Franklin | |
| 5,460,159 A | 10/1995 | Bussey | |
| 5,467,692 A | 11/1995 | Perez, III | |
| 5,473,979 A | 12/1995 | Ruben | |
| 5,512,312 A | 4/1996 | Forney et al. | |
| 5,515,774 A | 5/1996 | Swisher et al. | |
| 5,528,984 A | 6/1996 | Saurwein | |
| 5,531,154 A | 7/1996 | Perez, III | |
| 5,560,285 A | 10/1996 | Moreth | |
| 5,582,094 A | 12/1996 | Peterson et al. | |
| 5,617,778 A | 4/1997 | Schroeter et al. | |
| 5,673,613 A | 10/1997 | Price | |
| 5,676,048 A | 10/1997 | Schroeter et al. | |
| 5,711,209 A | 1/1998 | Guines | |
| 5,713,267 A | 2/1998 | Wilson | |
| 5,755,154 A | 5/1998 | Schroeter et al. | |
| 5,768,977 A | 6/1998 | Parris et al. | |
| 5,850,780 A | 12/1998 | Mascia et al. | |
| 5,865,099 A | 2/1999 | Waugh | |
| 5,865,100 A | 2/1999 | Knowles | |
| 5,891,498 A | 4/1999 | Boehler | |
| 5,942,142 A | 8/1999 | Forney et al. | |
| 5,952,029 A | 9/1999 | Freel | |
| 5,967,135 A | 10/1999 | Shariat | |
| 5,979,437 A | 11/1999 | Eberhardt | |
| 5,996,572 A | 12/1999 | Ilagan | |
| 6,012,381 A | 1/2000 | Hawn | |
| 6,035,770 A | 3/2000 | Whitefield | |
| 6,041,695 A | 3/2000 | Kuopus | |
| 6,050,177 A | 4/2000 | Lassig, Jr. | |
| 6,050,257 A | 4/2000 | Bond | |
| 6,059,849 A | 5/2000 | Lewis | |
| 6,095,132 A | 8/2000 | Ganard et al. | |
| 6,123,015 A | 9/2000 | McLain et al. | |
| 6,125,838 A | 10/2000 | Hedgpeth | |
| 6,155,160 A | 12/2000 | Hochbrueckner | |
| 6,167,797 B1 | 1/2001 | Bollich | |
| 6,223,737 B1 | 5/2001 | Buckner | |
| 6,230,700 B1 | 5/2001 | Daniels et al. | |
| 6,316,040 B1 | 11/2001 | Freel | |
| 6,523,463 B1 | 2/2003 | Hogle | |
| 6,557,545 B2 | 5/2003 | Williams | |
| 6,595,197 B1 | 7/2003 | Ganard | |
| 6,651,646 B1 | 11/2003 | Loyd et al. | |
| 6,701,829 B2 | 3/2004 | Farrow | |
| 6,705,213 B1 | 3/2004 | Thomas | |
| 6,708,604 B1 | 3/2004 | Deichler, Jr. | |
| 6,789,462 B1 | 9/2004 | Hamilton | |
| 6,810,792 B1 | 11/2004 | Knight | |
| 6,868,777 B1 | 3/2005 | Higgins et al. | |
| 6,874,496 B2 | 4/2005 | Waits et al. | |
| 7,159,509 B2 | 1/2007 | Starkey | |
| 7,895,942 B2 | 3/2011 | Karau | |
| 8,635,947 B2 | 1/2014 | Karau | |
| 8,800,542 B1 | 8/2014 | Kennington | |
| 9,526,376 B2 | 12/2016 | Karau | |
| 2004/0226454 A1 | 11/2004 | Pirkle et al. | |
| 2008/0047541 A1* | 2/2008 | Fou | A47J 37/07 |
| | | | 126/25 R |
| 2008/0268121 A1* | 10/2008 | Karau | A47J 37/0704 |
| | | | 426/523 |
| 2009/0056695 A1 | 3/2009 | Cosgrove | |
| 2011/0271847 A1 | 11/2011 | Tsao | |
| 2014/0137853 A1 | 5/2014 | Murray | |
| 2017/0071404 A1 | 3/2017 | Karau | |

OTHER PUBLICATIONS

Stump's Smokers, Internet website http://www.stumpssmokers.com/products1/htm; printed Jan. 11, 2008, 1 page.

Westly, Erica, IEEE Spectrum Online, "How to Build a Better Barbeque Pit", Jul. 2010 [retrieved Jul. 8, 2010] http://spectrum.ieee.org/geek-life/hands-on/how-to-build-a-better-barbeque-pit.

Ellerston, Kristin—Texas Monthly.com, "Smokin'," September [retrieved Sep. 21, 2010] http://www.texasmonthly.com/cms/printthis.php?file=webextra6.php&issue=2010-09-01; 2 pages.

* cited by examiner

BARBECUE OVEN AND METHOD OF OPERATION

RELATED APPLICATIONS

The present application is a continuation of U.S. patent application Ser. No. 13/826,559, filed Mar. 14, 2013, which is hereby incorporated by reference for all purposes as if set forth herein in its entirety.

FIELD OF THE INVENTION

The present disclosure relates to barbecue ovens, and more specifically to a firebox, draft system and method of operation that improves operator control of the combustion process and oven temperature.

BACKGROUND OF THE RELATED ART

Barbecue ovens are used to cook meat with the hot gases of a wood and/or charcoal fire. While most barbecue ovens are capable of producing excellent cooked meat, they suffer from a number of drawbacks, such as limited control of the combustion process and difficult control of oven temperature.

SUMMARY OF THE INVENTION

In accordance with an exemplary embodiment of the present disclosure, a barbecue oven is provided that includes a firebox, a cooking chamber, a passageway connecting the firebox to the cooking chamber, and a forced draft device configured to withdraw gases from the cooking chamber. The firebox comprises a vented charcoal tray disposed within a housing, an upper chamber above the charcoal tray, configured to hold wood and charcoal and comprising a vent configured to admit combustion air to the upper portion of the charcoal tray, and a lower chamber below the charcoal tray configured to collect ash. The cooking chamber is vented and configured to hold meat. The passageway connects the firebox to the cooking chamber and comprises an inlet configured to receive gases from the lower chamber of the firebox and an outlet configured to discharge gases into the cooking chamber. The forced draft device is thermostatically controlled and comprised in the vent in the cooking chamber, and when activated causes flow from atmosphere, through the vent in the upper chamber of the firebox to the upper portion of the charcoal tray, downward through the vent in the charcoal tray to the lower chamber of the firebox, through the passageway to the cooking chamber, and through the vent in the cooking chamber back to atmosphere. In this manner, the gases produced by the decomposition of wood and charcoal are thoroughly burned and oven temperature is controlled automatically.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
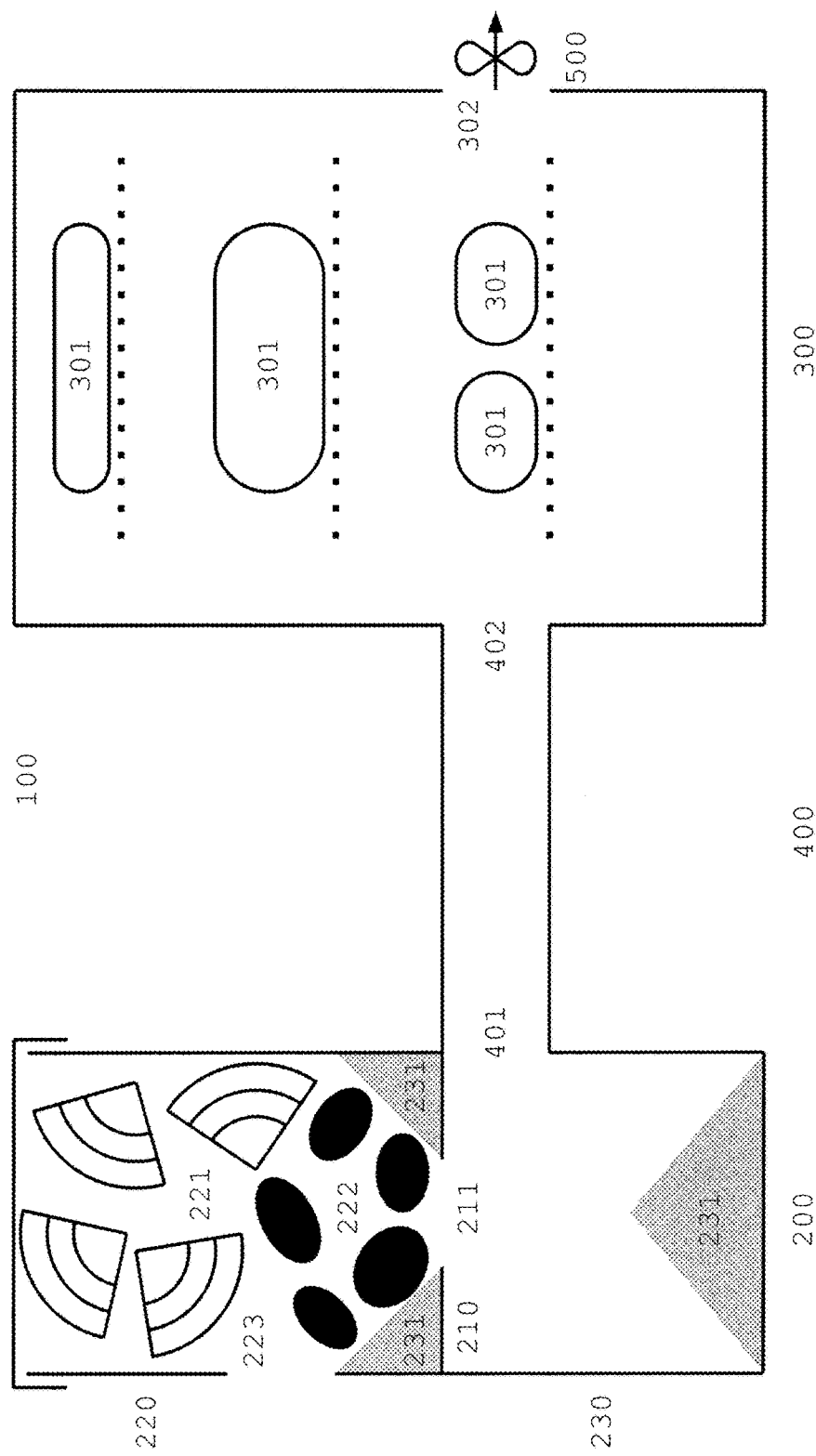
FIG. 1 is a cross-sectional diagram of a barbecue oven in accordance with an exemplary embodiment of the present disclosure.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of barbecue oven 100 in accordance with an exemplary embodiment of the present disclosure. Barbecue oven 100 can be made of carbon steel, stainless steel or other suitable materials and can be welded, riveted, or formed in other suitable manners. Barbecue oven 100 includes firebox 200 that includes charcoal tray 210 having vent 211 disposed therein. Firebox upper chamber 220 is located above charcoal tray 210 and is configured to hold wood 221, charcoal 222, and ash 223. Firebox upper chamber 220 also includes vent 223, which is configured to admit combustion air to the upper portion of charcoal tray 210. Firebox lower chamber 230 is located below charcoal tray 210 and is configured to collect ash 231. Cooking chamber 300 is configured to hold meat 301 and includes vent 302, which can be used to exhaust heated gas from cooking chamber 300 or for other suitable purposes.

Passageway 400 connects firebox 200 to cooking chamber 300 and includes inlet 401 and outlet 402. Forced draft device 500 is disposed in cooking chamber vent 302 and generates a pressure differential that causes air to flow from the atmosphere surrounding barbecue oven 100, through vent 223 in firebox upper chamber 220 to the upper portion of charcoal tray 210, downward through vent 211 in charcoal tray 210 to firebox lower chamber 230, through passageway 400 to cooking chamber 300, and through vent 302 back to the atmosphere. This action thoroughly combusts the gases generated by pyrolyzing wood 221 as they pass through hot, oxygenated charcoal 222 and produces a light, sweet flavor profile on meat 301 or other foods that are placed within cooking chamber 300.

Forced draft device 500 can further include a thermostat controller having a user-selectable temperature set point, wherein a thermocouple is disposed within cooking chamber 300. In this exemplary embodiment, when the temperature measured in cooking chamber 300 using the thermocouple is lower than the user-selectable temperature set point, forced draft device 500 can be activated and can draw uncombusted wood smoke from firebox upper chamber 220 through vent 211 of charcoal tray 210, thus creating clean, fully combusted smoke that is subsequently drawn through passageway 400 and into cooking chamber 300. This process can continue until the temperature within cooking chamber 300 increases past the set point, at which point the thermostat can turn the forced draft device off.

In one exemplary embodiment, barbecue oven 100 can include one or more features from the apparatus disclosed in U.S. Pat. No. 7,895,942, entitled "Barbecue Firebox and Method of Operation," issued Mar. 1, 2011, which is hereby incorporated by reference for all purposes as if set forth herein in its entirety.

Figure 2:
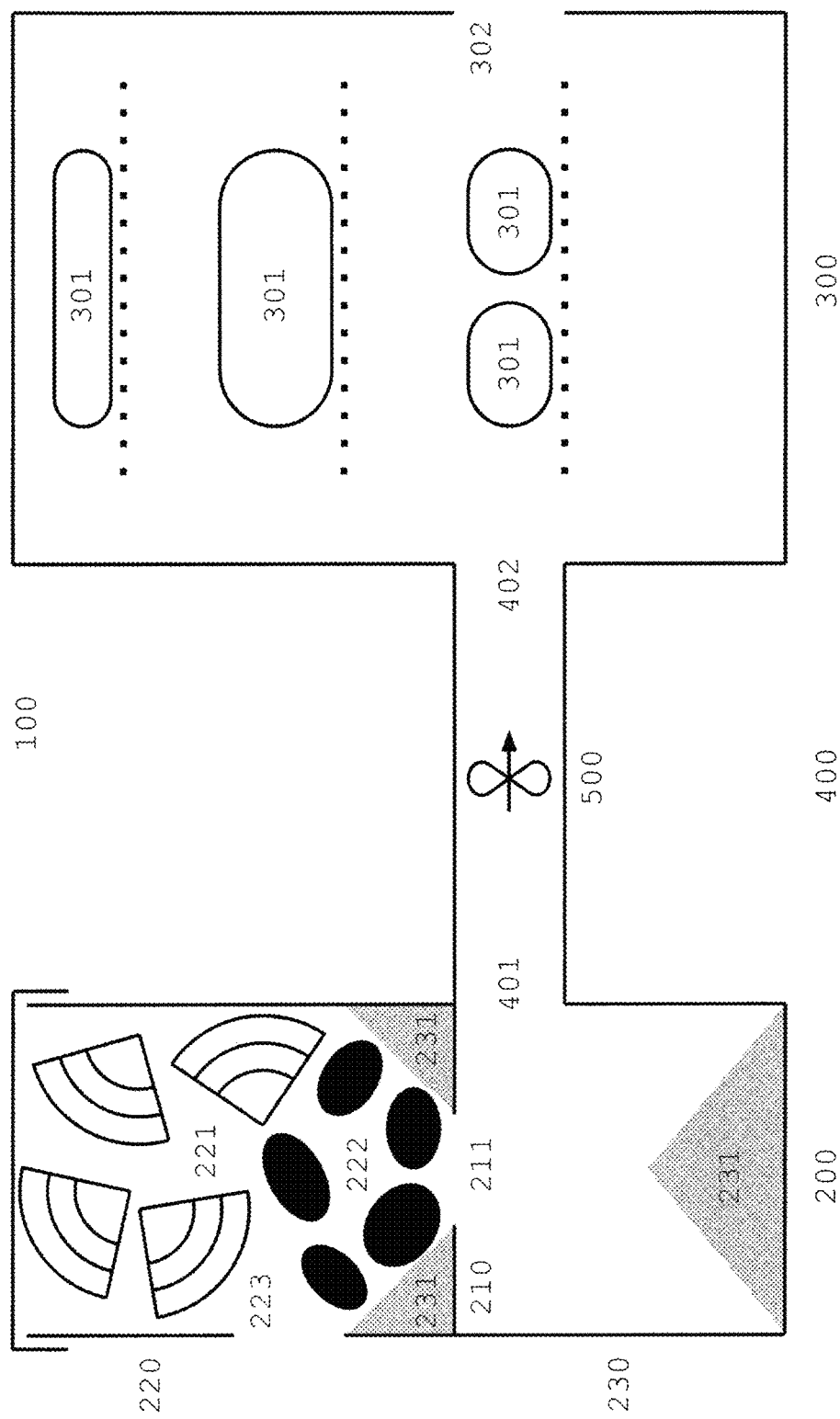
FIG. 2 is a cross-sectional diagram of a barbecue oven in accordance with an exemplary embodiment of the present disclosure.

FIG. 2 is a diagram of barbecue oven 100 in accordance with an exemplary embodiment of the present disclosure. In this exemplary embodiment, forced draft device 500 is located in passageway 400 and is of suitable design, such as an eductor, so as to tolerate the higher gas temperatures to which forced draft device 500 will be exposed in this location.

Figure 3:
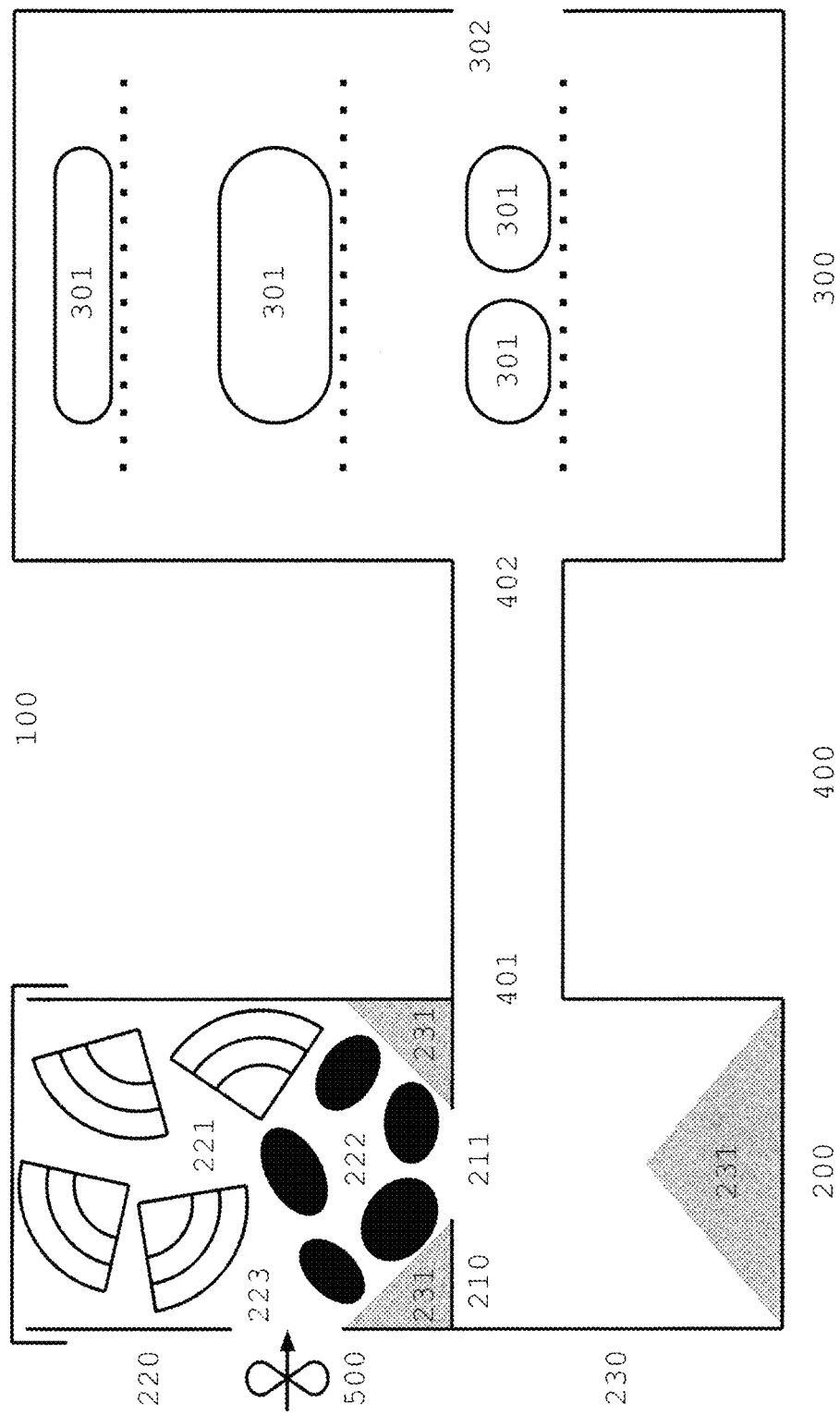
FIG. 3 is a cross-sectional diagram of a barbecue oven in accordance with an exemplary embodiment of the present disclosure.

FIG. 3 is a diagram of barbecue oven 100 in accordance with an exemplary embodiment of the present disclosure. In this exemplary embodiment, forced draft device 500 is attached to the firebox upper chamber vent 223 and is designed to allow high temperature backflow when deactivated, thereby preventing gases generated by pyrolyzing wood 221 from entering firebox lower chamber 230 uncombusted.

Figure 4:
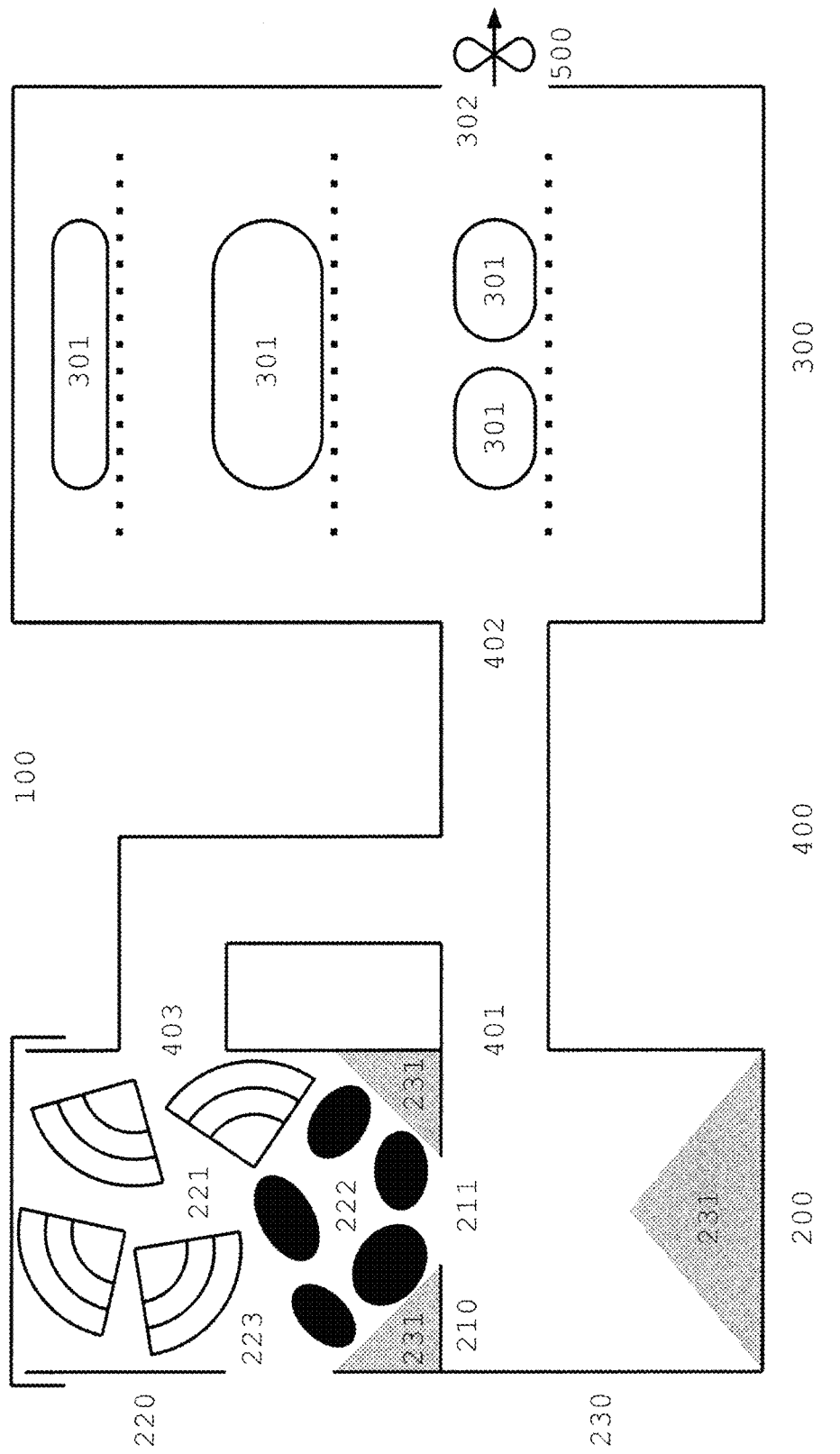
FIG. 4 is a cross-sectional diagram of a barbecue oven in accordance with an exemplary embodiment of the present disclosure.

FIG. 4 is a diagram of barbecue oven 100 in accordance with an exemplary embodiment of the present disclosure. In this exemplary embodiment, passageway 400 additionally comprises second inlet 403, which is configured to receive gases from firebox upper chamber 220 and wherein activation of forced draft device 500 additionally causes flow from firebox upper chamber 220, through passageway 400 to cooking chamber 300, bypassing hot, oxygenated charcoal 222. In this manner, partially combusted wood gases are provided to cooking chamber 300, which contributes a heavier, smoky flavor to meat 301 or other food in cooking chamber 300. While excessive volumes of such partially combusted wood gas can impart a harsh or bitter taste to the food in cooking chamber 300 if the food cooks for a long time (such as a beef brisket, pork butt or pork shoulder that might be cooked for six hours or more), if the food is not going to be cooked for a long period of time (such as a chicken or fish), the additional partially combusted wood gas can help to impart a wood smoked flavor to the food.

Figure 5:
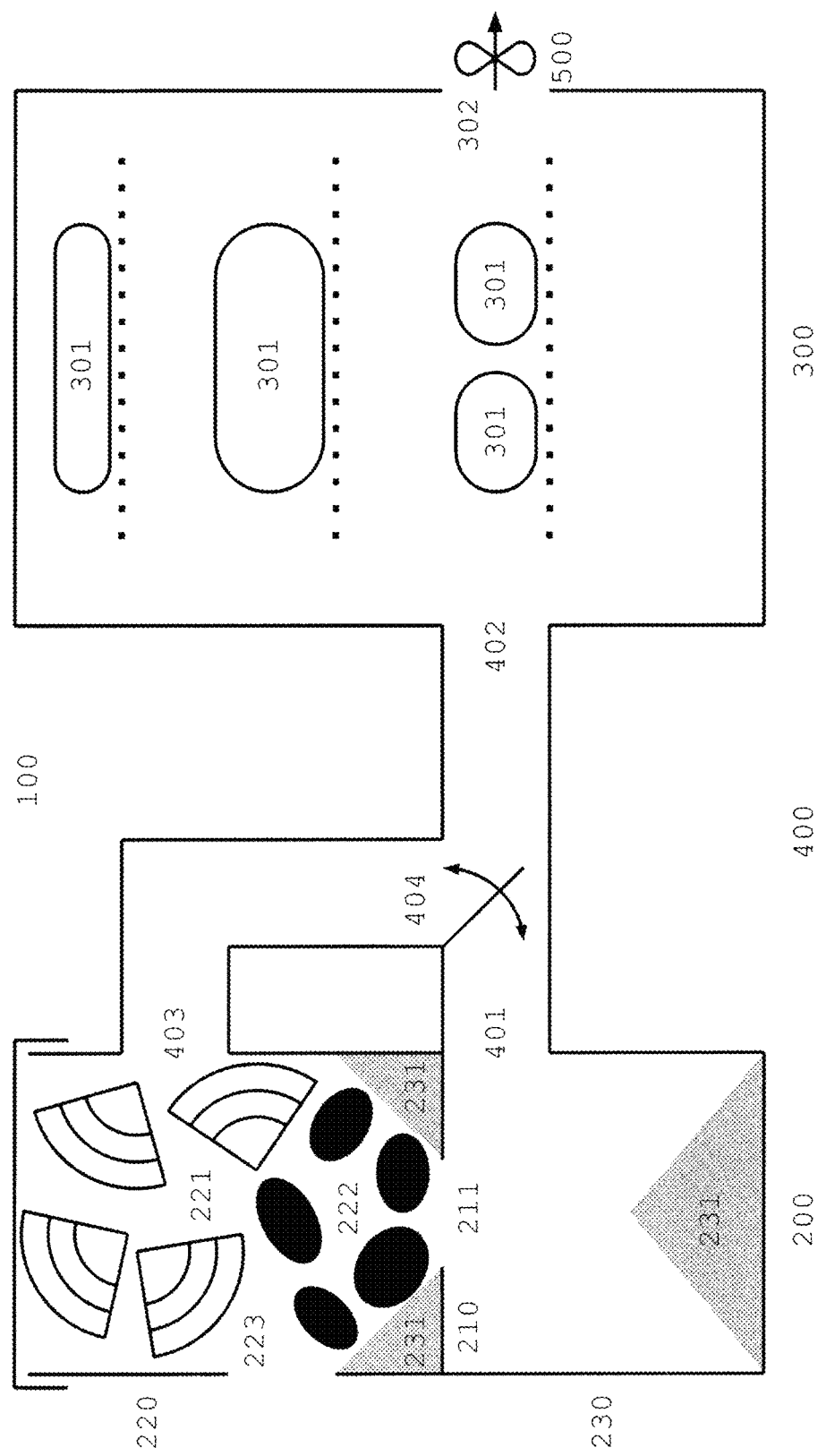
FIG. 5 is a cross-sectional diagram of a barbecue oven in accordance with an exemplary embodiment of the present disclosure.

FIG. 5 is a diagram of barbecue oven 100 in accordance with an exemplary embodiment of the present disclosure. Passageway 400 additionally comprises damper 404, which enables the operator to select light, sweet gases from firebox lower chamber 230 and/or heavy, smoky gases from firebox upper chamber 220. In this manner, the proportions of fully combusted wood gas and partially combusted wood gas that are introduced to the firebox can be selected and adjusted by the user.

Figure 6:
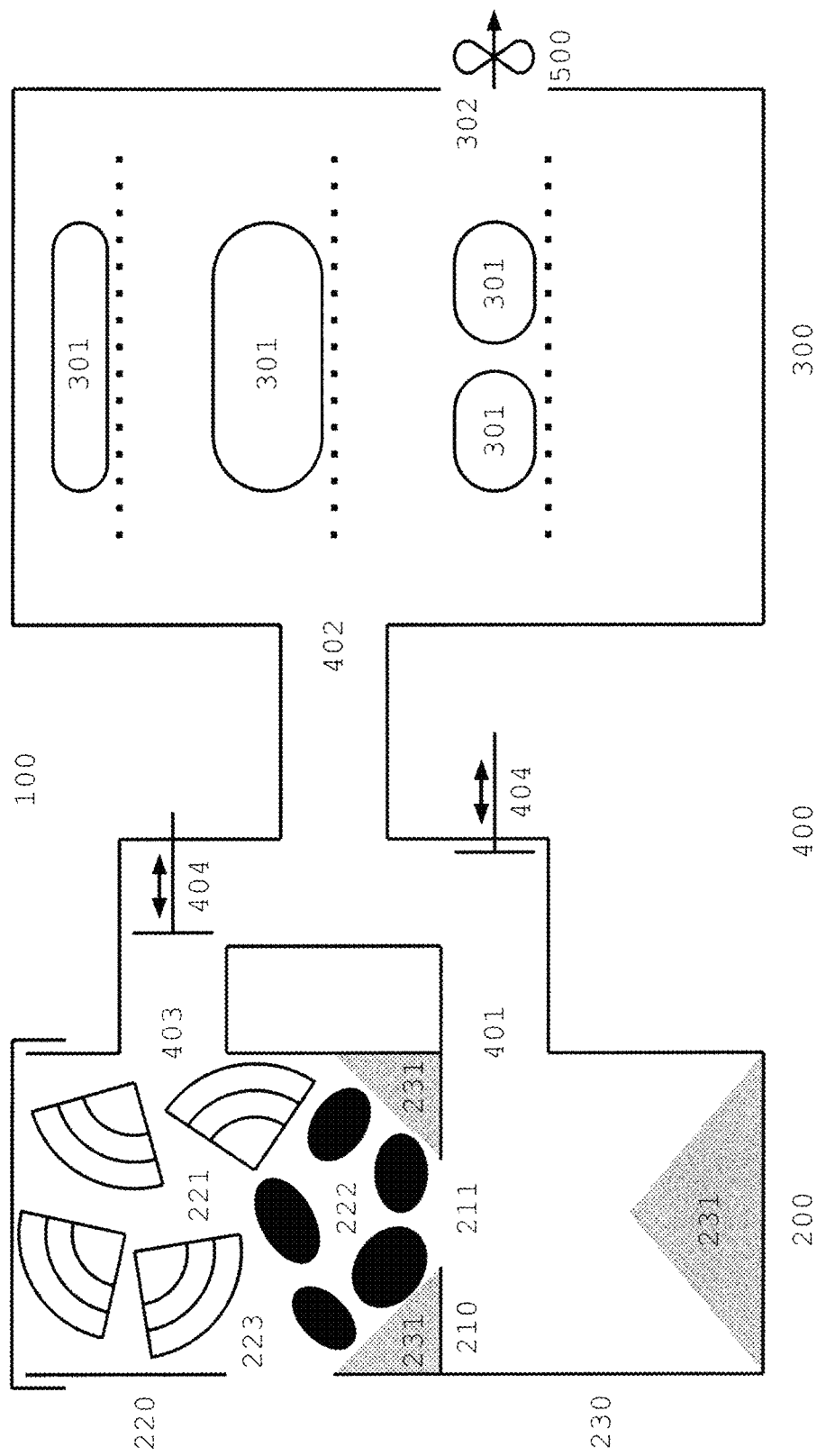
FIG. 6 is a cross-sectional diagram of a barbecue oven in accordance with an exemplary embodiment of the present disclosure.

FIG. 6 is a diagram of barbecue oven 100 in accordance with an exemplary embodiment of the present disclosure. Dampers 404 are of poppet valve style and enable the operator to select light, sweet gases from firebox lower chamber 230 and/or heavy, smoky gases from firebox upper chamber 220.

Figure 7:
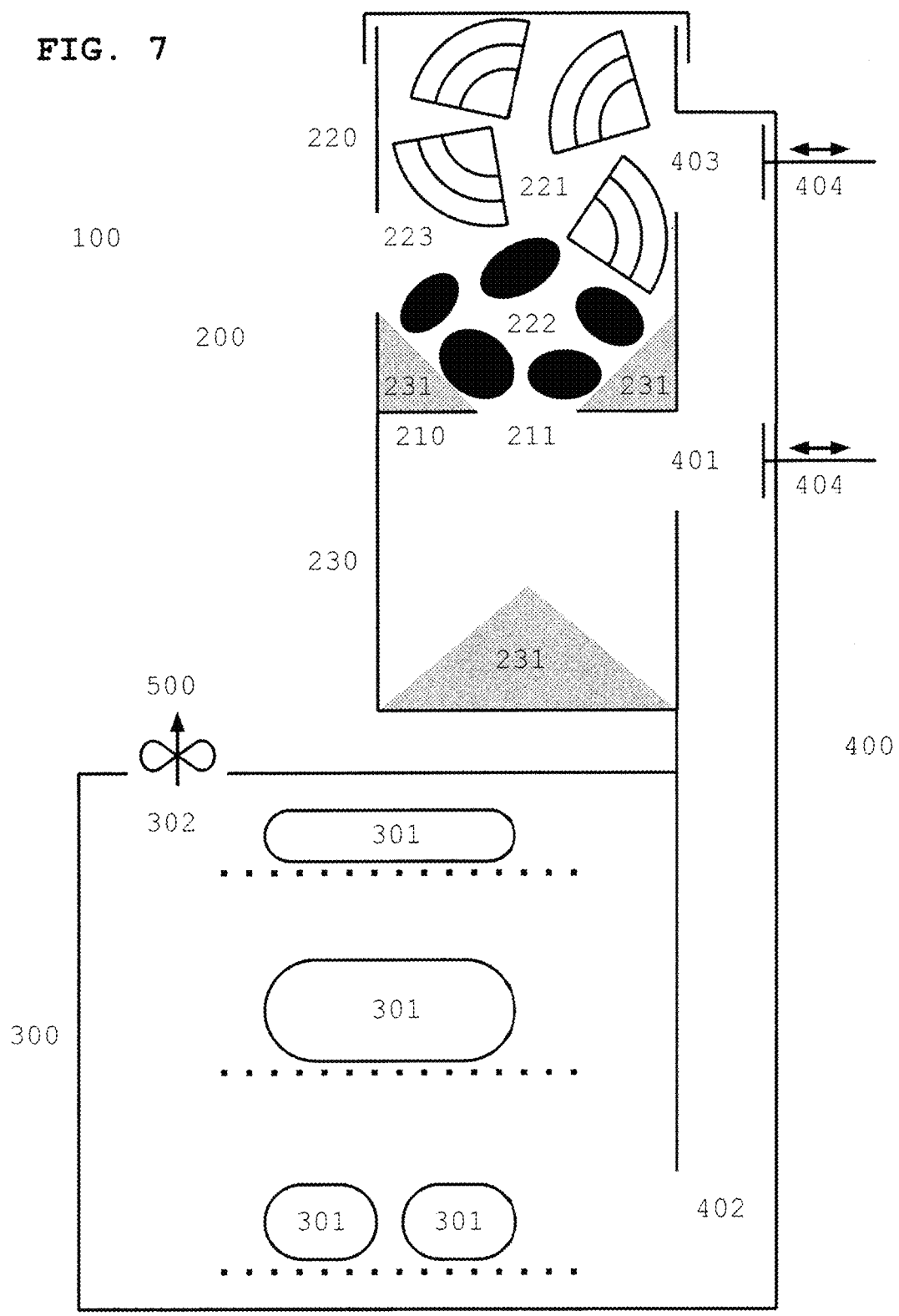
FIG. 7 is a diagram of a barbecue oven having a firebox on top, in accordance with an exemplary embodiment of the present disclosure.

FIG. 7 is a diagram of a barbecue oven 100 having a firebox on top, in accordance with an exemplary embodiment of the present disclosure. In this exemplary embodiment, firebox 200 can have a rectangular cross section and is disposed on top of cooking chamber 300. Passageway 400 extends downward from and adjacent to firebox 200 and cooking chamber 300, and can enter cooking chamber 300 at the bottom, so as to create a more even distribution of heat within cooking chamber 300.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A barbecue oven comprising:
   a firebox;
   a cooking chamber;
   a manifold coupled between the firebox and the cooking chamber, the manifold containing:
      a first valve configured to block or draw uncombusted smoke from the firebox to the cooking chamber; and
      a second valve configured to block or draw combusted smoke through a charcoal bed of the firebox to the cooking chamber.

2. The barbecue oven of claim 1 further comprising a forced draft device configured to draw uncombusted smoke from the first valve and combusted smoke from the second valve.

3. The barbecue oven of claim 1 wherein the firebox further comprises a charcoal tray disposed within a housing and having a vent.

4. The barbecue oven of claim 1 wherein the firebox further comprises an upper chamber above a charcoal tray, configured to hold wood and charcoal and having the first valve.

5. The barbecue oven of claim 1 wherein the firebox further comprises a lower chamber below a charcoal tray, configured to collect ash and having the second valve.

6. The barbecue oven of claim 1 wherein the manifold further a comprises an elongated passageway containing the first valve, the second valve and coupled to the cooking chamber.

7. The barbecue oven of claim 1 wherein the manifold is an elongated manifold that is disposed adjacent to both of the firebox and the cooking chamber.

8. The barbecue oven of claim 1 wherein the manifold is an elongated manifold that is disposed adjacent to both of the firebox and the cooking chamber and comprises a first inner wall section disposed between the firebox and a second inner wall portion disposed between the cooking chamber.

9. The barbecue oven of claim 1 wherein the manifold is an elongated manifold that is disposed adjacent to both of the firebox and the cooking chamber and comprises a first inner wall section disposed between the firebox and a second inner wall portion disposed between the cooking chamber, and the firebox is disposed on top of the cooking chamber and is structurally isolated from the cooking chamber by the manifold.

10. A barbecue oven comprising:
    a firebox;
    a cooking chamber;

a passageway coupled to the firebox and the cooking chamber, the passageway containing;

a first valve configured to block or draw uncombusted smoke from the firebox to the passageway; and a second valve configured to block or draw combusted smoke through a charcoal bed of the firebox to the passageway.

11. The barbecue oven of claim 10 further comprising a forced draft device configured to draw uncombusted smoke from the first valve and combusted smoke from the second valve.

12. The barbecue oven of claim 10 wherein the firebox further comprises an upper chamber above a charcoal tray, configured to hold wood and charcoal and having the first valve.

13. The barbecue oven of claim 10 wherein the firebox further comprises a lower chamber below a charcoal tray, configured to collect ash and having the second valve.

14. The barbecue oven of claim 10 wherein the passageway is coupled to the first valve, the second valve and the cooking chamber.

15. A barbecue oven comprising:

a firebox;

a cooking chamber;

a first valve configured to block or draw uncombusted smoke from the firebox to the cooking chamber through a passageway; and a second valve configured to block or draw combusted smoke through a charcoal bed of the firebox to the cooking chamber through the passageway.

16. The barbecue oven of claim 15 further comprising a forced draft device configured to draw uncombusted smoke from the first valve and combusted smoke from the second valve and an elongated passageway coupled between the firebox and the cooking chamber, the elongated passageway containing the first valve and the second valve.

17. The barbecue oven of claim 15 wherein the firebox further comprises a charcoal tray disposed within a housing and having a vent to an external environment through which oxygenated air is drawn.

18. The barbecue oven of claim 15 wherein the firebox further comprises an upper chamber above a charcoal tray, configured to hold wood and charcoal and having a portion of the first valve.

19. The barbecue oven of claim 15 wherein the firebox further comprises a lower chamber below a charcoal tray, configured to collect ash and having a portion of the second valve.

20. The barbecue oven of claim 15 wherein the elongated passageway includes a wall that contains a portion of the first valve and the second valve.

* * * * *